United States Patent [19]

Yamamori et al.

[11] Patent Number: 5,303,098
[45] Date of Patent: Apr. 12, 1994

[54] DISC CHUCKING MECHANISM

[75] Inventors: Eiji Yamamori; Tetsu Yanagisawa, both of Tokyo, Japan

[73] Assignee: Sony Corporation, Japan

[21] Appl. No.: 56,940

[22] Filed: May 5, 1993

Related U.S. Application Data

[63] Continuation of Ser. No. 610,796, Nov. 8, 1990, abandoned.

[30] Foreign Application Priority Data

Nov. 16, 1989 [JP] Japan .................................. 1-298614

[51] Int. Cl.$^5$ .......................................... G11B 17/028
[52] U.S. Cl. .................................................. 360/99.12
[58] Field of Search ............... 360/99.05, 99.08, 99.12; 369/270, 271

[56] References Cited

U.S. PATENT DOCUMENTS

| | | | |
|---|---|---|---|
| 3,857,526 | 12/1974 | Dischert | 242/68.3 |
| 4,618,900 | 10/1986 | Saito | 360/99.12 |
| 4,649,532 | 3/1987 | Aldenhoven | 369/270 |
| 4,730,300 | 3/1988 | Kamoshita et al. | 369/270 |
| 4,958,839 | 9/1990 | Guzik et al. | 369/271 |

FOREIGN PATENT DOCUMENTS

| | | | |
|---|---|---|---|
| 0159100 | 10/1985 | European Pat. Off. | 369/270 |
| 2078456 | 11/1971 | France . | |
| 2443116 | 6/1980 | France . | |
| 8401462 | 4/1984 | World Int. Prop. O. | |
| 9000798 | 1/1990 | World Int. Prop. O. | |

OTHER PUBLICATIONS

Patent Abstracts of Japan: vol. 8, No. 23 (p.251) (1460) Jan. 31, 1984, relating to JP-A-58 179 972 (Matsushita Denki Sangyo), Oct. 21, 1983.
IBM Technical Disclosure Bulletin, vol. 21, No. 8, Jan. 1979, p. 3080, K. Jooss, "Self-centering disk drive".

Primary Examiner—Robert S. Tupper
Attorney, Agent, or Firm—Ronald P. Kananen

[57] ABSTRACT

A disc chucking unit for supporting a disc loaded on a disc table for rotation in unison with the disc table is constituted by the disc table on which a disc is placed and which is rotationally driven by a rotating driving unit, a fitting member arranged at the center of the disc table and fitted into a central opening of the disc, and a plurality of ball-shaped member reciprocably mounted in the fitting member. These ball-shaped members are biased outwardly from the fitting member by an elastic element for thrusting the disc placed on the disc table towards the disc table, so that the disc may be loaded in a centered and offset-free state on the disc table despite the small-sized and simplified construction of the chucking unit.

7 Claims, 8 Drawing Sheets

DISC CHUCKING MECHANISM

This application is a continuation of application Ser. No. 07/610,796 filed Nov. 8, 1990, now abandoned.

BACKGROUND OF THE INVENTION

This invention relates to a disc chucking mechanism or a unit for supporting a disc loaded on a disc table, such as an optical disc or a magneto-optical disc, for rotation in unison with the disc table.

BRIEF DESCRIPTION OF THE RELATED ART

There have been proposed a disc-shaped recording medium, such as an optical disc or a magneto-optical disc, and a disc apparatus for recording and/or reproducing information signals on or from the disc-shaped recording medium.

With such a disc apparatus, the disc-shaped recording medium needs to be rotated, with the signal recording surface of the disc-shaped recording medium facing a pickup device adapted for recording and/or reading information signals on or from the signal recording surface. To this end, the disc apparatus includes a disc chucking unit adapted for holding the disc-shaped recording medium at a predetermined position and adapted for being rotated by a driving unit.

Figure 1:
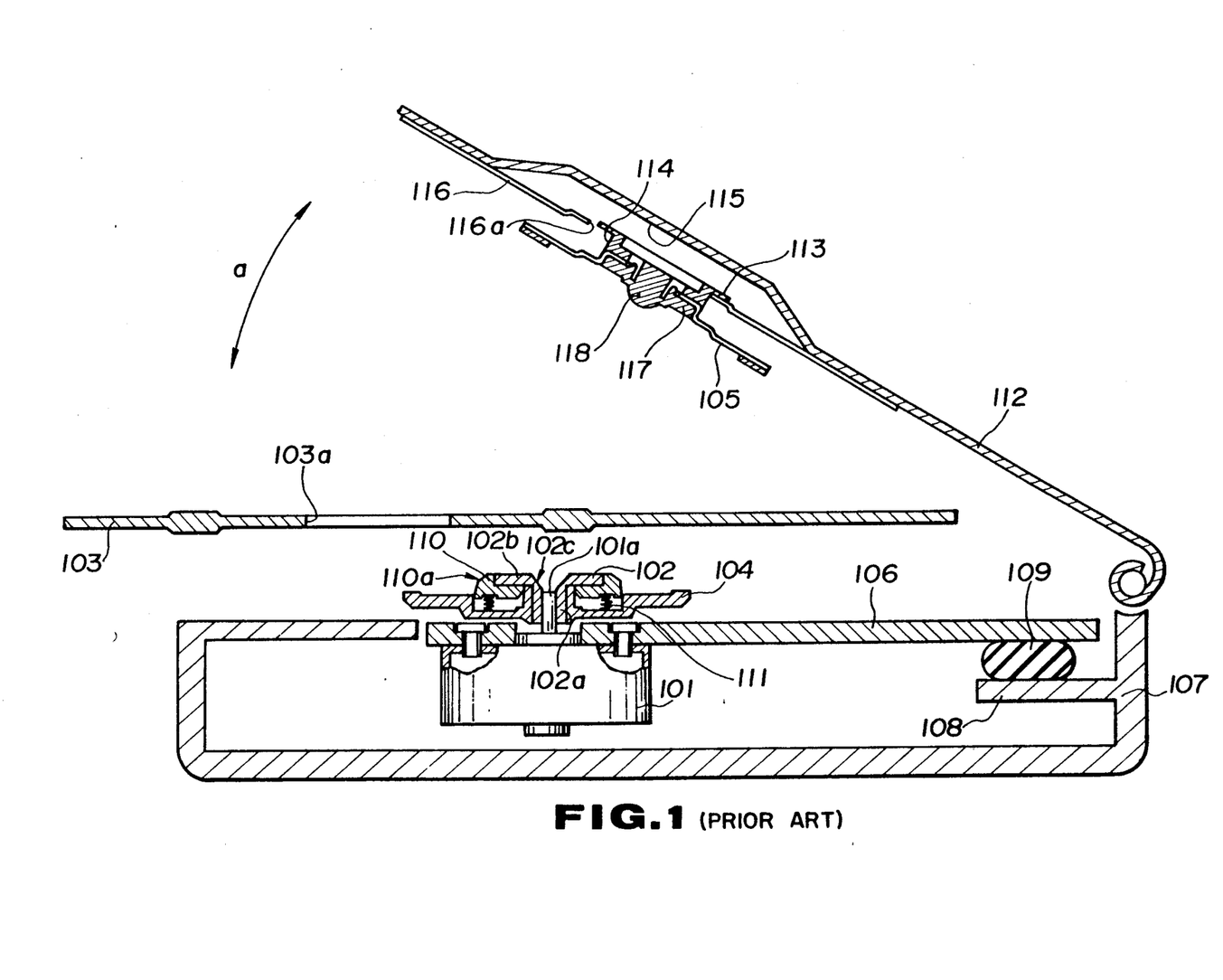
FIG. 1 is a longitudinal cross-section showing a conventional disc chucking unit and a disc apparatus employing the unit.

Referring to FIG. 1, the disc chucking unit includes a disc table 104 mounted on a driving shaft 101a of an electric motor 101 as driving means by means of a stop ring 102 and mounting a disc-shaped recording medium 103 thereon, and a chucking plate 105 mounted in opposition to the disc table 104 and adapted for clamping the disc-shaped recording medium 103 in cooperation with the disc table 104.

The electric motor 101 is mounted on a motor supporting plate 106 and supported in this state within an outer casing 107 of the disc apparatus. The motor supporting plate 106 is supported in a floating manner with respect to a chassis 108 provided within the outer casing 107 by the interposition of a plurality of elastic elements 109 so that vibrations or impacts applied to the disc apparatus will be scarcely propagated to the motor 101.

The stop ring 102 has a shaft 102a, fitted to and supported by the driving shaft 101a, and a flange 102b disposed at the distal side of the driving shaft 101a. The disc table 104 is fitted to and supported by the disc table 104. Thus the lower surface of the flange 102b facing the motor 101 is confronted by a central portion of the upper surface of the disc table 104.

A center ring 110 is interposed between the flange 102b and the disc table 104. This center ring 110 has a central through-hole 110a through which the shaft 102a of the stop ring 102 is fitted so that the center ring 110 is supported for movement along the axis of the driving shaft 101a between the flange 102b and the disc table 104. A centering spring 111 is installed between the center ring 110 and the disc table 104 for thrusting the center ring 110 onto the lower surface of the flange 102b.

The outer periphery 110a of the center ring 110 is substantially conical, that is, it is tapered upward or towards the distal side of the driving shaft 101a. The outer periphery 110a is opened to the outside as it surrounds the outer periphery of the flange 102a.

The chucking plate 105 is formed as a disc and supported on the side of the lower surface of a cover member 112 mounted on the outer casing 107 so as to face the disc table 104. As shown by an arc a in FIG. 1, the cover member 112 is mounted on and supported by the outer casing 107 so as to be movable in a direction both towards and away from the disc table 104.

Above the chucking plate 105, there is mounted a supporting member 114 having a disc-shaped flange 113 with a smaller diameter than the chucking plate 105. The supporting member 114 is disposed within a housing section 115 formed integrally with the cover member 112. Below the housing section 115, a holding plate 116 having a through-hole 116a, which is of a diameter larger than the supporting member 114 and smaller than the flange 113 and through which is passed the supporting member 114, is mounted for closing the housing section 115. Thus the chucking plate 115 may be rotatable while being movable vertically within the boundaries of the housing section 115.

A toroidal-shaped permanent magnet 117 is mounted at the center of the chucking plate 105, so that, when the chucking plate 105 and the disc table 104 draw close to each other, they attract each other magnetically.

A ball-shaped projection 118 is formed at the center of the lower surface of the chucking plate 105. A conical recess 102c for receiving the projection 118 is provided at the center on the upper surface of the flange 102b confronted by the chucking plate 105. When the chucking plate 105 is thrust toward the disc table 104, the ball-shaped projection 118 fits into the conical recess 102c for centering the chucking plate 105 with respect to the disc table 104.

Figure 2:
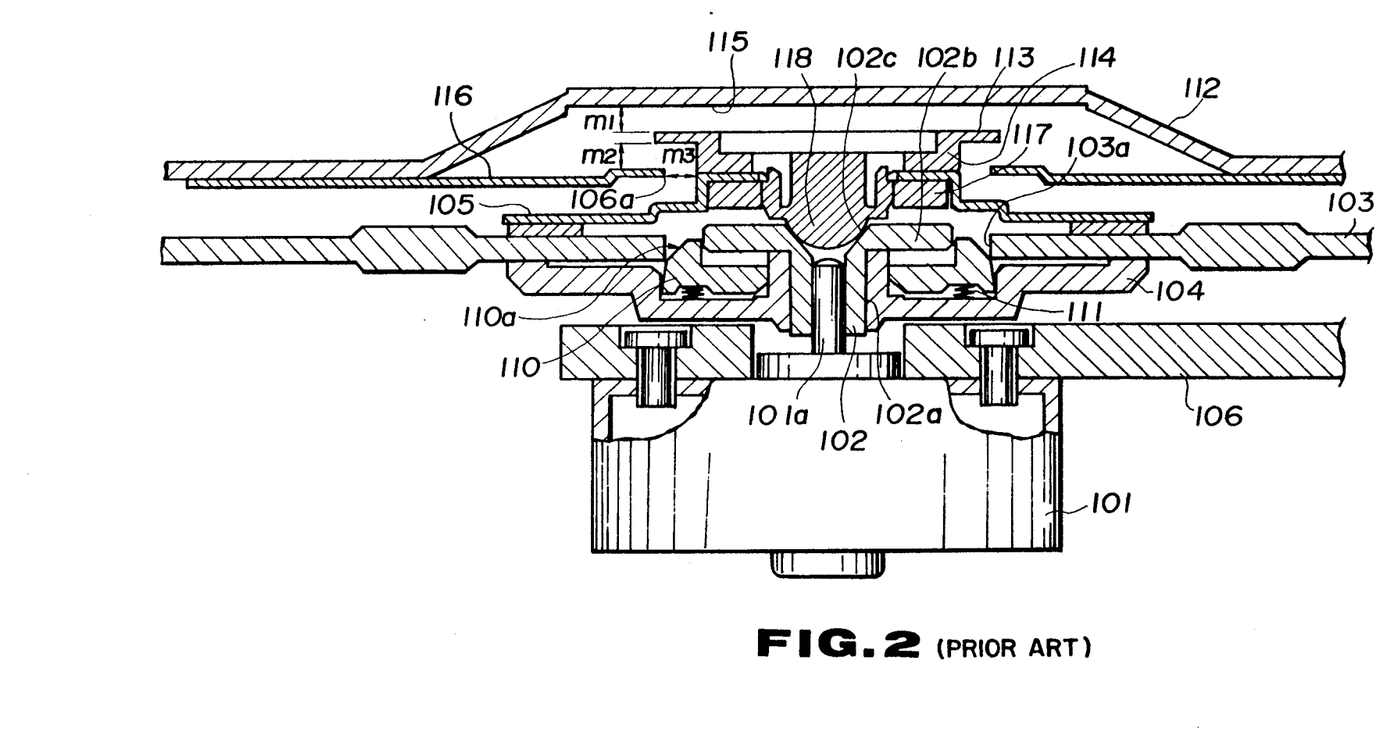
FIG. 2 is an enlarged longitudinal cross-section showing the state in which a disc is loaded on the disc chucking unit shown in FIG. 1.

With the above described disc chucking mechanism, the disc-shaped recording medium 103 is placed on the disc table 104, with the outer periphery 110a of the center ring 110 abutting the inner periphery of a central chucking opening 103a formed in the disc-shaped recording medium 103. When the cover member 112 is shifted towards the disc table 104, the recording medium 103 is clamped between the chucking plate 105 and the disc table 104, as shown in FIG. 2. Since the outer periphery 110a of the center ring 110 is conical, and the center ring 110 is biased upwards by the centering spring 111, the inner periphery of the chucking opening 103a is thrust by the outer periphery 110a for centering the disc-shaped recording medium 103 relative to the driving shaft 101a.

When the driving shaft 101a is driven into rotation by the electric motor 101, the disc-shaped recording medium 103 is rotated in unison with the disc table 104 and the chucking plate 105.

Meanwhile, with the above described disc chucking unit, when the disc-shaped recording medium 103 is loaded while it is clamped by the disc table 104 and the chucking plate 105, the chucking plate 105 is floatingly supported relative to the chassis 108 by means of the disc-shaped recording medium 103, disc table 104, electric motor 101 and the motor supporting plate 106. Thus the supporting member 114 may be moved to the extent shown by gaps m1, m2 and m3 relative to the chassis 108 due to an impact or vibrations propagated from outside.

With such a disc chucking unit, for realizing a smooth rotation of the disc-shaped recording medium 103, it is necessary to prevent the supporting member 114 from abutting the cover member 112, even if the supporting member 114 should be moved relative to the chassis 108. Therefore, the gap between the housing section 115 and the supporting member 114 should be larger than the amount of movement that is allowed by the floating support between the chassis 108 and the motor supporting plate 106, that is, the gaps m1, m2 and m3 in FIG. 2 should be present between the housing section 115 and the supporting member 114.

Therefore, with the disc apparatus making use of the above described disc chucking unit, the central portion of the cover member 112 needs to be bulged upwards to provide the supporting member housing section 115, preventing the apparatus from being reduced in size or thickness.

In addition, the above described disc chucking unit can be assembled or fabricated only by a painstaking operation because of the larger number of component parts making up the disc chucking unit.

OBJECT AND SUMMARY OF THE INVENTION

It is therefore an object of the present invention to provide a disc chucking mechanism or unit which may be assembled and fabricated easily and which contributes to a reduction in the size and thickness of a disc apparatus.

The present invention provides a disc chucking mechanism comprising a disc table on which a disc having a central opening is placed and which is rotationally driven by rotating driving means, a fitting member arrayed at the center of said disc table and fitted into said central opening thereof, and a plurality of ball-shaped members reciprocally mounted in said fitting member, said ball-shaped members being biased outwardly from said fitting member by an elastic element for thrusting said disc placed on said disc table towards said disc table.

With the above-described disc chucking unit, when the disc is placed on the disc table, the ball-shaped members reciprocally mounted in a fitting member arranged centrally with respect to the disc table and biased outwards by an elastic element abut on the upper edge of the inner lateral surface of the central opening of the disc, so that the disc is elastically thrusted and supported towards the disc table so as to be loaded and retained on the disc table.

The above and other objects and advantages of the present invention will become more apparent from the following description, especially in conjunction with the accompanying drawings.

DETAILED DESCRIPTION OF PREFERRED EMBODIMENTS

By referring to the accompanying drawings, a preferred embodiment of the present invention will be explained in detail.

Figure 3:
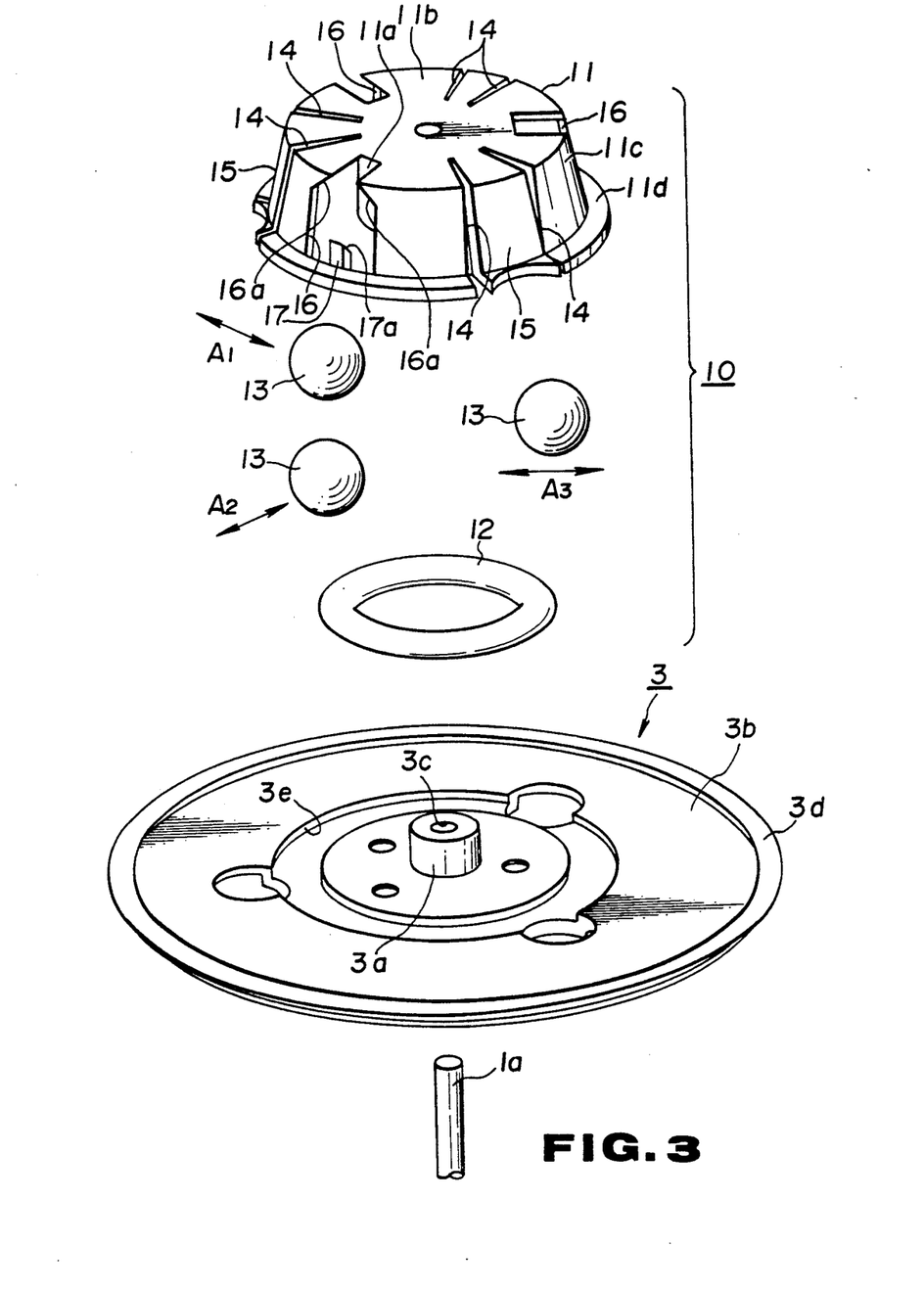
FIG. 3 is an enlarged exploded perspective view showing the construction of a disc chucking unit according to the present invention.
Figure 4:
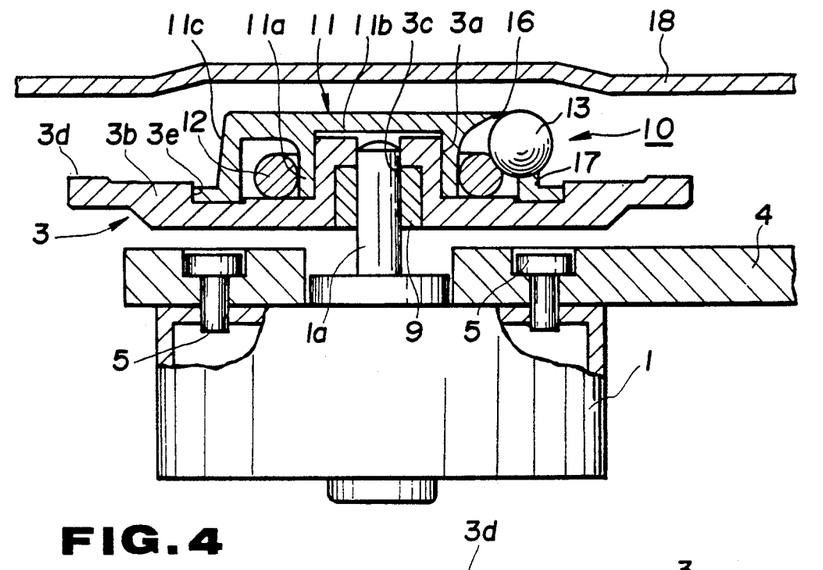
FIG. 4 is an enlarged longitudinal cross-section showing the construction of the disc chucking unit shown in FIG. 3.
Figure 5:
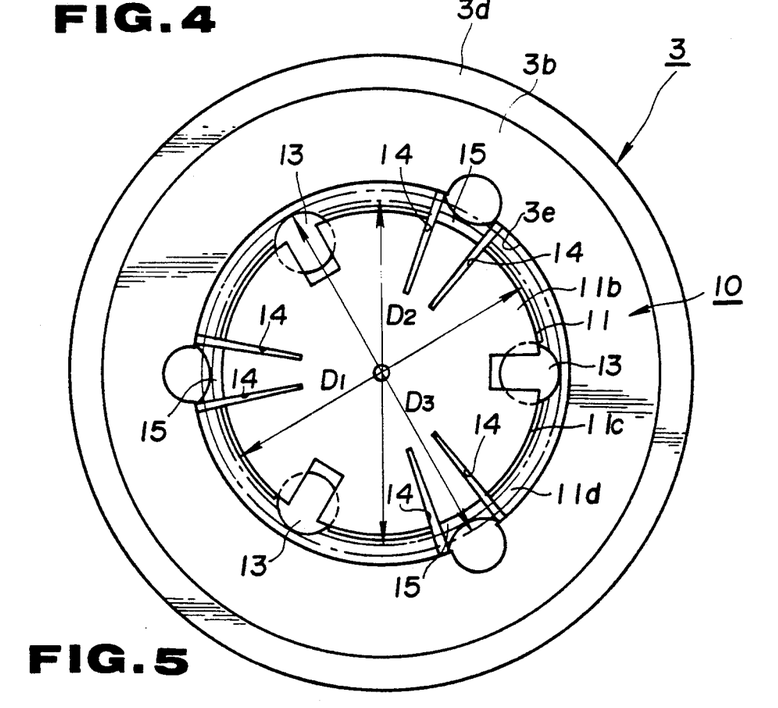
FIG. 5 is an enlarged plan view showing the construction of the chucking unit shown in FIG. 3.

As shown in FIGS. 3 to 5, the disc chucking unit of the present invention is provided with a disc table 3 fitted to a driving shaft 1a of an electric motor 1 of the rotating driving unit and on which is placed a disc 2 as the recording medium.

Figure 6:
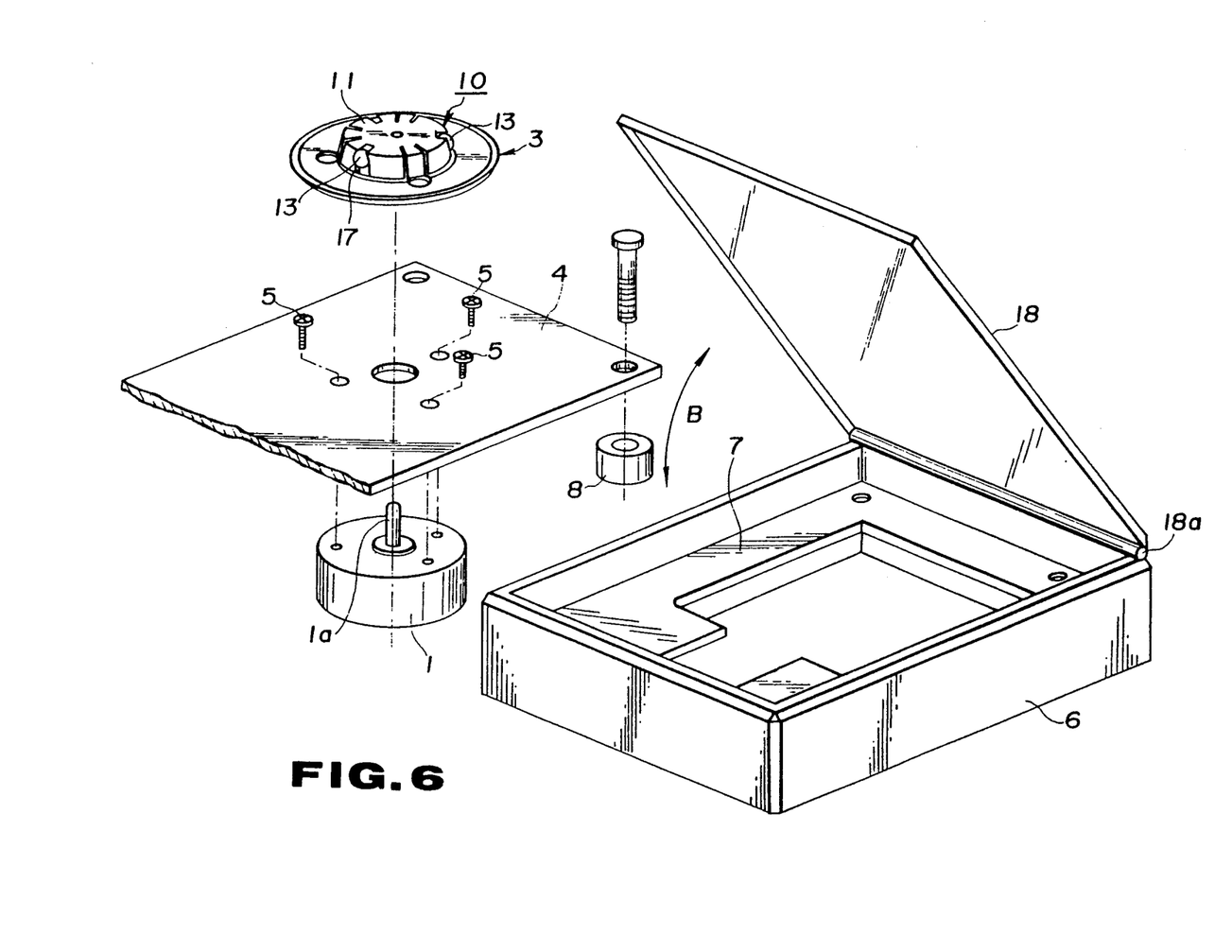
FIG. 6 is an exploded perspective view of a disc apparatus constructed by using the disc chucking unit shown in FIG. 3.

As shown in FIG. 6, the electric motor 1, secured by set screws 5 to a motor supporting plate 4 constituting a disc apparatus to which the disc chucking unit is applied, is supported within an outer casing 6 of the disc apparatus. For preventing vibrations or impacts applied to the outer casing 6 from being propagated to the motor 1, the motor supporting plate 4 is floatingly supported with respect to a chassis 7 provided in the outer casing 6 by the interposition of a plurality of resilient elements 8 formed of rubber or otherwise designed as springs.

Although not shown, an optical pickup device or a magnetic head device adapted for recording and/or reading information signals on or from the disc 2 is mounted on the motor supporting plate 4 for movement towards and away from the motor 1.

As shown in FIGS. 3 and 4, the disc table 3 is formed unitarily from a synthetic resin or a like material, and is constituted by a substantially cylindrical shaft 3a and a substantially disc-shaped plate section 3b on the motor side, lower extremity of the shaft 3a. A supporting opening 3c, into which fits the driving shaft 1a, is formed at the center of the shaft 3a. A disc abutment section 3d, in the form of a circumferential rib, is provided on the outer upper periphery of the plate section 3b.

On the inner surface of the supporting opening 3c, a supporting metal ring 9 is interposed between the inner surface of the opening 3c and the driving shaft 1a for positively supporting the disc table 3 by the driving shaft 1a. The supporting metal ring 9 is mounted on the disc table 3, for example by so-called "insert molding".

On the upper end of the shank 3a, corresponding to the distal end of the driving shaft 1a, a fitting or centering unit 10 is mounted, as shown in FIGS. 3 to 5. This centering unit 10 is constituted by a cap 11 which is fitted into a central chucking opening 2a in the disc 2, an O-ring 12 which is inserted into the cap 11 as an elastic member, and a plurality of (in this case, three) steel balls 13 as ball-shaped members.

The cap 11 is formed unitarily of synthetic resin, and is constituted by a supporting section 11a fitted to the outer periphery of a shaft 3a of the disc table 3, a flange-shaped ceiling plate section 11b provided on the upper peripheral side of the supporting section 11a, and a side wall section 11c descending from the outer rim of the ceiling plate section 11b towards the disc table 3. The outer peripheral surface of the side wall section 11c is substantially conical so that the diameter thereof is decreases gradually towards the distal end of the driving shaft 1a. The side wall section 11c is so contoured that the diameter of the outer peripheral surface thereof at the lower end thereof towards the disc table 3 as shown by an arrow $D_1$ in FIG. 5 is slightly smaller than the central opening 2a. An outwardly extending flange section 11d is formed at the lower end of the side wall section 11c.

Three pairs of slits 14 are formed such that they extend from the ceiling plate section 11b to the flange section 11d by way of the side wall section 11c at an angular interval of approximately 120°. The zone delimited between each of the paired slits 14, 14 is formed as a deflectable portion 15 which may be deformed elastically in a direction towards and away from the supporting section 11a. These deflectable portions 15 are so designed that the diameter $D_2$ of a circumscribed circle containing the outer periphery of the deflectable portions 15 at the lower end of the side wall section 11c is slightly larger than the central opening 2a.

The cap 11 is so designed that, when the cap is mounted on the disc table 3, the flange section 11d fits into a circular groove 3e formed on the upper surface of the plate section 3b. Hence, each deflectable portion 15 has its distal side forming a part of the flange 11d fitted into the groove 3e so as to be deflected to the extent that the distal side is moved within the groove 3e.

The O ring 12, accommodated within the cap 11, is formed of synthetic rubber or a like material, and is arranged to surround the supporting section 11a.

The steel balls 13 are kept in contact with the upper outer periphery of the O ring 12 and are supported in this state by being clamped between the O ring 12 and the cap 11. The steel balls are arranged between the deflectable portions 15, 15 at an angular interval of approximately 120°.

The cap 11 is formed with through-holes 16, in register with the steel balls 13, for exposing the steels balls to outside. These through-holes 16 are formed as slits extending from the ceiling plate section 11b to the side wall section 11c. Thus the through-holes 16 extend radially in the ceiling plate section 11b and vertically in the side wall section 11c from the upper side to the lower side thereof. Each through-hole 16 is of a width smaller than the diameter of each steel ball 13 in the ceiling plate section 11b and a width approximately equal to the diameter of the steel ball 13 in the side wall section 11c. On the lower surface of the ceiling plate section 11b, there are provided a pair of inclined sections 16a on both sides of each through-hole 16 which are tapered downward from each through-hole 16. The lower side of the inclined section 16a is contiguous to the inner lateral edge of the through-hole 16 in the side wall section 11c.

Each steel ball 13 abuts the paired inclined sections 16a in the cap 11 so as to be clamped between these inclined sections 16a. Thus the steel balls 13 may be moved along the paired inclined sections 16a radially of the ceiling plate section 11b as shown by arrows $A_1$ to $A_3$ in FIG. 3.

Three retention lugs 17 are formed in the flange 11d of the cap 11 in register with the through-holes 16. Each retention lug 17 has its distal end 17a abutted against the associated steel ball 13 to control the movement of the associated steel ball 13 towards the outside of the cap 11. The distal end 17a is formed as a concave spherical surface mating with the spherical surface of the steel ball 13.

Each steel ball 13 is supported and positioned by the O ring 12, the paired inclined sections 16a, and the distal end 17a of the retention lug 17. Each steel ball 13 thus positioned is protruded via each through-hole 16 towards the outside of the side wall 11c in an amount corresponding to about 30 to 50 percent of its diameter. The steel balls 13 are positioned at this time so that the diameter $D_3$ (FIG. 5) of a circumscribed circle containing the outwardly protruded portions of the steel balls 13 is larger than the central opening 2a. When moved towards the inside of the cap 11 (i.e., towards the shaft 11a), the steel balls 13 press against the O ring 12 and deform the O ring elastically, as a result of which the steel balls 13 are biased in the direction of being protruded out of the cap 11.

Referring to FIG. 6, a cover member 18 of an appropriate size to cover the disc 2 is rotatably supported by a pivot shaft 18a on the outer casing 6 of the disc apparatus for pivotal movement towards and away from the disc table 3 as shown by an arc B in FIG. 6.

Figure 7:
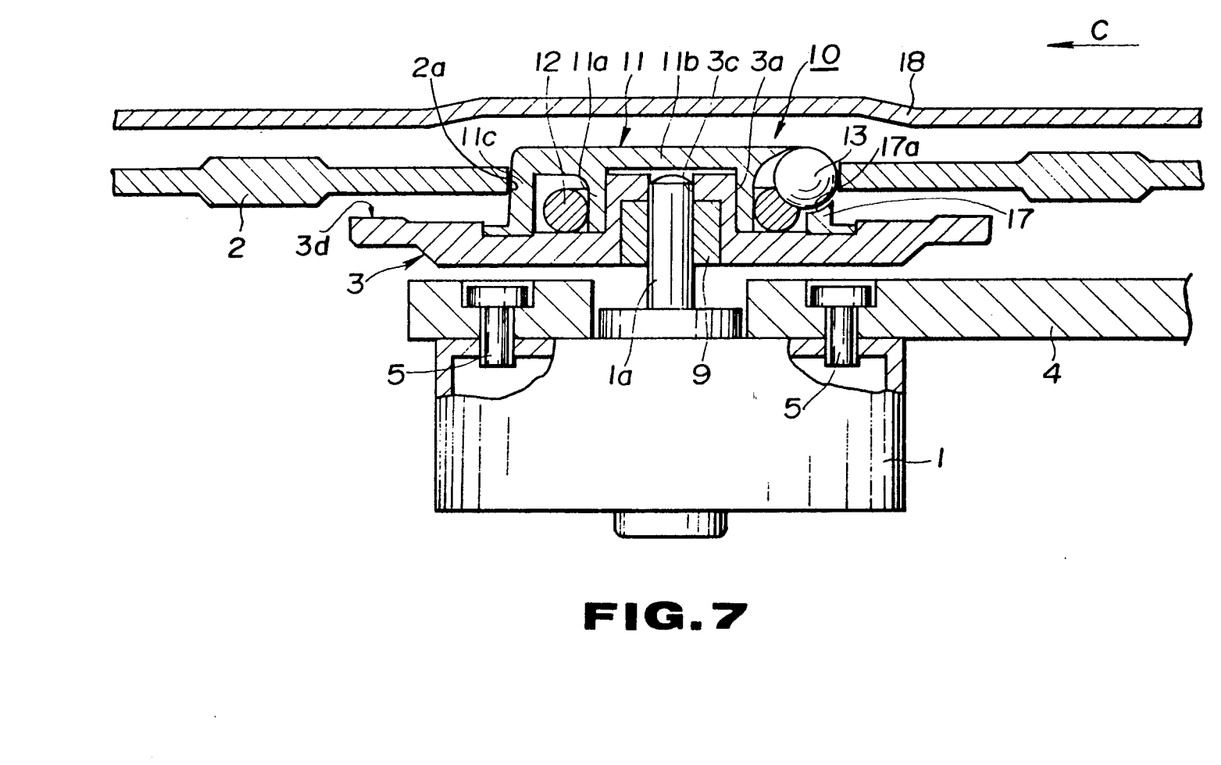
FIG. 7 is an enlarged longitudinal cross-section showing a disc being loaded on the disc chucking unit of FIG. 3.

When loading the disc 2 in the above described disc chucking unit, the centering unit 10 is fitted into the central opening 2a of the disc 2. At this time, the inner lateral surface of the central opening 2a is abutted by the periphery of the steel balls 13 protruded outwards from the side wall section 11c, as shown in FIG. 7, so that these steel balls 13 are shifted towards the inner side of the cap 11, as shown by an arrow C in FIG. 7, to cause elastic deformation of the O ring 12.

Figure 8:
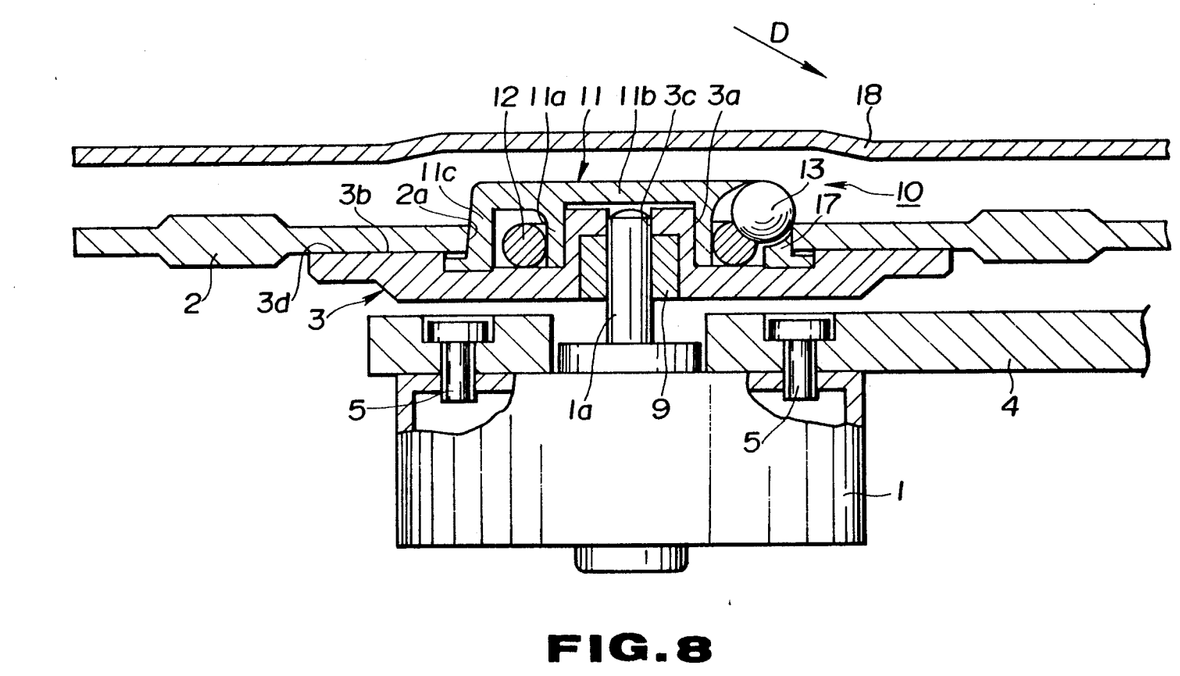
FIG. 8 is an enlarged longitudinal cross-section showing a disc loaded on the disc chucking unit of FIG. 3.

When the disc 2 is moved further to approach to the disc table 3 and placed ultimately thereon, the inner lateral surface of the central opening 2a of the disc 2 is positioned between the peripheral portions of the steel balls 13 protruded out of the side wall section 11c and the disc table 3, while the inner lateral surface of the opening 2a is kept in abutment with the steel balls 13, as shown in FIG. 8. At this time, each steel ball 13 abuts the upper edge of the inner lateral surface of the central opening 2a. Thus the O ring 12 thrusts the upper edge of the inner lateral surface of the central opening 2a by means of the steel balls 13 in an obliquely downward direction as shown by an arrow D in FIG. 8. That is, the O ring 12 thrusts and supports the disc 2 with respect to the disc table 3, while centering the disc 2 with respect to the driving shaft 1a.

At this time, each deflectable portion 15 is abutted by the inner lateral surface of the central opening 2a so as to be elastically deflected towards the inside of the cap 11. Thus the deflectable portions 15 are thrust against the inner lateral surface of the central opening 2a for centering the disc 2 with respect to the driving shaft 1a.

When the disc 2 is positioned and loaded on the disc table 3 and the driving shaft 1a is driven into rotation by the motor 1, the disc 2 is rotated in unison with the disc table 3 to effect recording and/or readout of the information signals with the aid of the optical pickup device or the magnetic head device.

Figure 9:
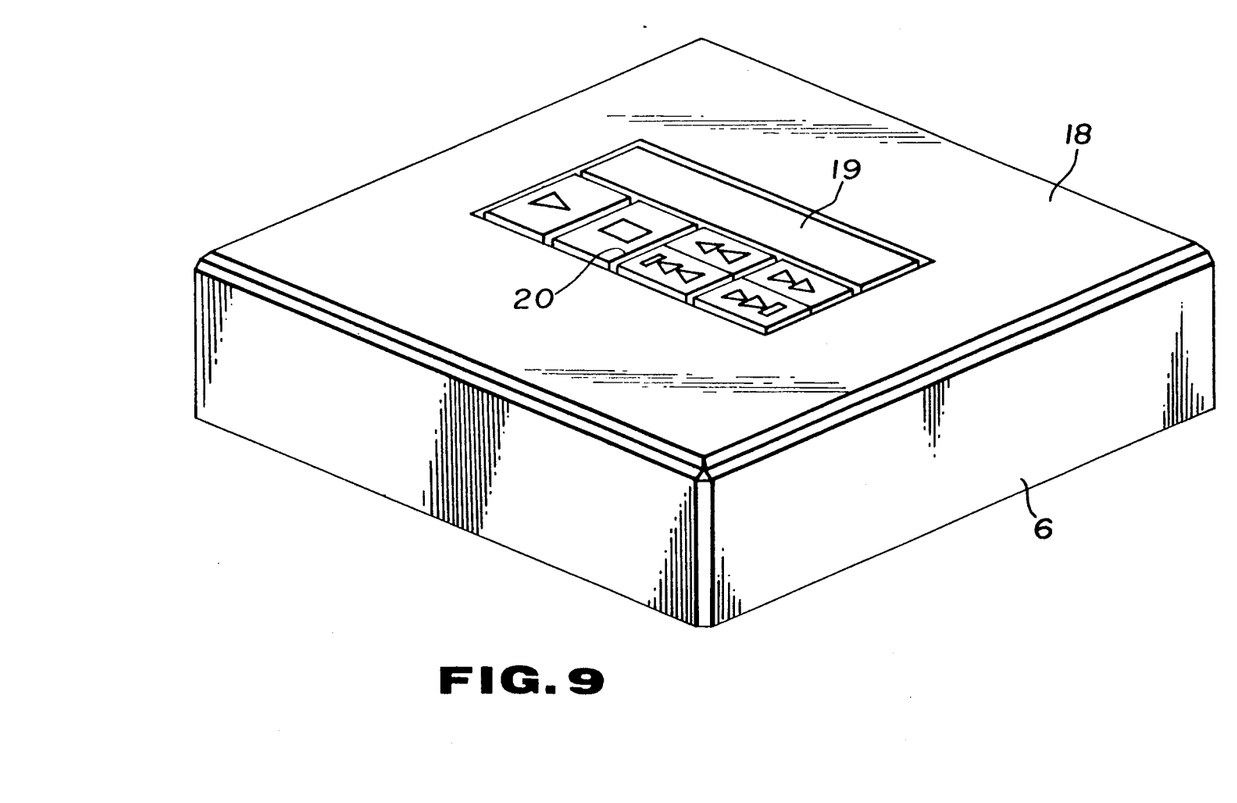
FIG. 9 is a perspective view showing the disc apparatus of FIG. 8 in its entirety.

It will be noted that the cover member 18 constituting the disc apparatus making use of the disc chucking unit of the present invention may be designed as a flat plate, as shown in FIG. 9, and a display unit 19 or an operating unit 20 including switches or pushbuttons may be easily mounted at a central portion on the upper surface of the cover member 18 in register with the disc table 3.

The disc chucking unit according to the present invention is not limited to the above described embodiment. For example, four or more steel balls 13 may be employed. In this case, four or more through-holes 16 may be provided in register with these steel balls 13.

The number of the deflectible portions 15 may similarly be four or more, if so desired.

The elastic member of the disc chucking unit of the present invention need not be an O ring, but may be separate elastic elements associated with the ball-shaped members.

It will be seen from the foregoing that, with the disc chucking unit of the present invention, the ball-shaped members reciprocably mounted inside a fitting member arranged at the center of the disc table and biased outwards by the elastic element abut the upper edge of the inner lateral surface of the central opening of the disc when the disc is placed on the disc table, so that the disc is thrust on to and supported elastically with respect to the disc table so as to be retained and loaded on the disc table.

Thus it is possible with the disc chucking unit of the present invention to load the disc on the disc table without employing a chucking plate which is mounted in opposition to the disc table.

What is claimed is:

1. A disc chucking mechanism comprising:
   a disc table having an axis of rotation and a flat-plate portion on which a disc having a central opening is placed, said flat-plate portion being formed at an outer periphery of said disc table;
   a cap member disposed on said disc table at a position which is coaxial with said axis of rotation of the disc table, said cap member being formed with a plurality of slits arranged about an outer periphery thereof, said slits defining deflectable portions of said cap member which are displaceable in a radial direction of said disc table;
   a ring-shaped member provided within said cap member and being made of an elastic material; and
   a plurality of ball-shaped members provided within said cap member and protruding from an outer periphery of said cap member, said ball-shaped members being biased outwardly of said cap member by engagement with said ring-shaped member, wherein a disc placed on said disc table is thrusted towards said disc table by engagement of the central opening of the disc with said ball-shaped members, and said deflectable portions of said cap member engage the central opening of the disc for centering the disc with respect to said axis of rotation of said disc table.

2. The disc chucking mechanism according to claim 1, wherein said ring-shaped member comprises an O-ring positioned coaxial with said axis of rotation of said disc table, said O-ring having a circular cross-section in a plane containing said axis of rotation.

3. A disc chucking mechanism comprising:
   a disc table having an axis of rotation and a flat-plate portion on which a disc having a central opening is placed, said flat-plate portion being formed at an outer periphery of said disc table;
   cap member disposed on said disc table at a position which is coaxial with said axis of rotation of said disc table, said cap member having a plurality of displacing portions arranged about an outer periphery thereof, said displacing portions being displaceable in a radial direction of said disc table;
   a ring-shaped member provided within said cap member and being made of an elastic material; and
   a plurality of ball-shaped members provided within said cap member and protruding from an outer periphery of said cap member, said ball-shaped members being biased outwardly of said cap member by engagement with said ring-shaped member;
   whereby a disc placed on said disc table is thrusted towards said disc table by engagement of the central opening of the disc with said ball-shaped members, and wherein said displaceable portions of said cap member engage the central opening of the disc for centering the disc with respect to said axis of rotation of said disc table.

4. The disc chucking mechanism according to claim 3, wherein said displacing portions are defined by a plurality of radially extending slits formed in said cap member.

5. The disc chucking mechanism according to claim 4, wherein said displacing portions are elastically deformable.

6. The disc chucking mechanism according to claim 5, wherein said disc table includes a groove formed on an upper surface thereof, said cap member includes a flange fitted into said groove, and said displacing portions of the cap member include an outermost portion fitted into said groove, wherein displacement of said displacing portions in a radial direction is limited by said groove.

7. The disc chucking mechanism according to claim 3, wherein said ring-shaped member comprises an O-ring positioned coaxial with said axis of rotation of said disc table, said O-ring having a circular cross-section in a plane containing said axis of rotation.

* * * * *